United States Patent
Perez-Noguera

(10) Patent No.: US 7,813,774 B2
(45) Date of Patent: Oct. 12, 2010

(54) CONTACT, MOTION AND POSITION SENSING CIRCUITRY PROVIDING DATA ENTRY ASSOCIATED WITH KEYPAD AND TOUCHPAD

(75) Inventor: Gritsko Perez-Noguera, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 853 days.

(21) Appl. No.: 11/465,515

(22) Filed: Aug. 18, 2006

(65) Prior Publication Data

US 2008/0042978 A1  Feb. 21, 2008

(51) Int. Cl.
*H04M 1/00* (2006.01)
*G06F 3/02* (2006.01)
*G06F 3/041* (2006.01)
*G06F 3/044* (2006.01)

(52) U.S. Cl. .............. 455/575.1; 455/550.1; 345/169; 345/173; 345/174

(58) Field of Classification Search .......... 455/575.1, 455/550.1, 556.2
See application file for complete search history.

(56) References Cited

U.S. PATENT DOCUMENTS

| | | | | |
|---|---|---|---|---|
| 5,572,205 A | * | 11/1996 | Caldwell et al. | 345/168 |
| 5,666,113 A | * | 9/1997 | Logan | 345/168 |
| 5,917,906 A | * | 6/1999 | Thornton | 379/433.07 |
| 6,927,763 B2 | * | 8/2005 | La Monica | 345/174 |
| 2002/0025837 A1 | * | 2/2002 | Levy | 455/566 |
| 2002/0137550 A1 | * | 9/2002 | Graham et al. | 455/566 |
| 2003/0025679 A1 | * | 2/2003 | Taylor et al. | 345/175 |
| 2005/0146510 A1 | * | 7/2005 | Ostergard | 345/173 |
| 2005/0212749 A1 | * | 9/2005 | Marvit et al. | 345/156 |
| 2007/0151838 A1 | * | 7/2007 | Lundell et al. | 200/512 |
| 2007/0273560 A1 | * | 11/2007 | Hua et al. | 345/156 |
| 2008/0271980 A1 | * | 11/2008 | Seo | 200/293 |

FOREIGN PATENT DOCUMENTS

WO  WO 02100074 A2 * 12/2002
WO  WO 2006133593 A1 * 12/2006

* cited by examiner

*Primary Examiner*—Nick Corsaro
*Assistant Examiner*—Tangela T. Chambers
(74) *Attorney, Agent, or Firm*—Turocy & Watson, LLP

(57) ABSTRACT

The claimed subject matter provides a system and/or a method that facilitates providing data entry associated with a keypad and a touchpad. An interface can facilitate receiving input data. A combined circuitry component can employ a keypad functionality and a touchpad functionality based on the input data utilizing a single circuitry.

21 Claims, 14 Drawing Sheets

CONTACT, MOTION AND POSITION SENSING CIRCUITRY PROVIDING DATA ENTRY ASSOCIATED WITH KEYPAD AND TOUCHPAD

BACKGROUND

In the not too distant past, mobile communication devices in general, and mobile telephones in particular, were luxury items only affordable to those with substantial income. Furthermore, these mobile communication devices were significant in size, rendering them inconvenient for extended portability based at least in part upon size (e.g., battery, housing, circuitry, etc.). For example, in contrast to today's mobile telephones (and other mobile communication devices), mobile telephones of the recent past could not be placed into a user's pocket and/or handbag without causing extreme discomfort. In other words, the benefit of mobile communications was diminished due to the inconvenient characteristics associated with such former mobile communication devices.

The development, refinement, and advancements in mobile communications have rapidly increased to allow convenient and efficient mobile communications and/or mobile communication devices, wherein such above-described deficiencies have been overcome. Mobile communication devices have added functionality (e.g. game applications, web access, storage capacity, address books, display size, ergonomics, battery life, capture/display images, capture/display video, text message, etc.), while also decreased in size (e.g., housing, circuitry, battery, etc.). More importantly, the costs of such mobile communication devices and mobile communication services have decreased rapidly due to various technological advancements within the industry.

Furthermore, the development and refinement of mobile communication devices continues to occur at an extremely rapid pace. Advancements in mobile communication devices are mostly based upon consumer demand. In order to fulfill consumer needs, the industry provides a plurality of devices (e.g., models of devices having various applications, and features). Smaller devices, game applications, web access, storage capacity, display size, ergonomics, phonebook storage, longer battery life, are a few examples that encourage the mobile communication device industry to improve upon existing technology.

Mobile devices are increasing in technological ability wherein mobile communication devices can provide a plurality of functionality within a limited device-space. Mobile communication devices can be, but not limited to, cell phones, PDA, pagers, tablets, messenger devices, hand-helds, pocket translators, bar code scanners, smart phones, scanners, portable handheld scanners, . . . . Although each device employs a specific function for a user, devices have been developing to allow overlapping functionality in order to appeal to consumer needs. In other words, mobile communication devices have incorporated a plurality of features and/or applications such that the devices have invaded one another's functionality. For example, cell phones can provide cellular service, phonebooks, calendars, games, voicemail, paging, web browsing, video capture, image capture, voice memos, voice recognition, high-end mobile phones (e.g., smartphones becoming increasingly similar to portable computers/laptops in features and functionality), etc.

As a result, personal computing devices have incorporated a variety of techniques and/or methods for inputting information. Personal computing devices facilitate entering information employing devices such as, but not limited to, keyboards, keypads, touch pads, touch-screens, speakers, stylus' (e.g., wands), writing pads, . . . However, input devices such as keypads, speakers and writing pads bring forth user personalization deficiencies in which each user can not utilize the data entry technique (e.g., voice, and/or writing) similarly. Within different geographical regions, voice and writing recognition entail numerous comprehension boundaries to overcome in order to meet the consumer need of data entry. Such boundaries can be geographical and linguistic related dependent upon the individual case. For example, consumers utilizing voice recognition in the United States can speak English, yet have distinct and/or different accents. In another example, consumers employing writing recognition in the United States can write in English, yet have distinct and/or different letter variations. Moreover, there are additional limitations intrinsic to the way mobile communication devices are commonly used. For instance, voice recognition systems are difficult to use in meetings or noisy environments. In addition, pointing devices like stylus or touchpads are difficult to use while walking or driving. Therefore, consumer need for efficient data entry techniques is apparent based on the features and/or applications abilities hinge on such interaction.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing a circuit that combines keypad functionality and touchpad functionality. A combined circuitry component can enhance data entry with the ability to provide a keypad functionality and a touchpad functionality. The combined circuitry component can be employed with a single circuitry that allows conventional keypad data entry and position sensing for touchpad functionality. An interface component can receive input data, wherein the combined circuitry component can employ position sensing (e.g., surface location about at least one key) and key sensing (e.g. depressing a specific key).

In accordance with one aspect of the claimed subject matter, a combined circuitry can be employed on a single circuit, wherein the single circuit includes a top layer, a dielectric layer, and a bottom layer. The top layer can have a raised dome portion that can be aligned with a key on a keypad. The dielectric layer can include at least one opening, wherein the opening can be aligned with a key on a keypad. The dielectric layer can be sandwiched between the top layer and the bottom layer to create a capacitor that facilitates detecting a surface contact to employ motion data entry.

In accordance with another aspect of the claimed subject matter, the dual functionality of keypad and touchpad can be utilized by a device having at least a portion of a keypad. The device can be, for instance, a smart phone, a mobile communication device, a cellular device, a text messenger, a portable digital assistant (PDA), a mobile phone, a personal communicator, a handheld device, a handheld gaming device, a portable computer, a desktop, a laptop, a pager, a tablet PC, a communication device, a navigation device, multimedia player, any device featuring a combination of the listed functionalities, any suitable device utilizing a keypad for data entry, an Internet browsing device, a stereo, a car stereo, a dashboard related to an automobile, any device employing at least one key and/or button, etc. In other aspects of the claimed subject matter, methods are provided that facilitates employing a circuit that combines keypad functionality and touchpad functionality.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
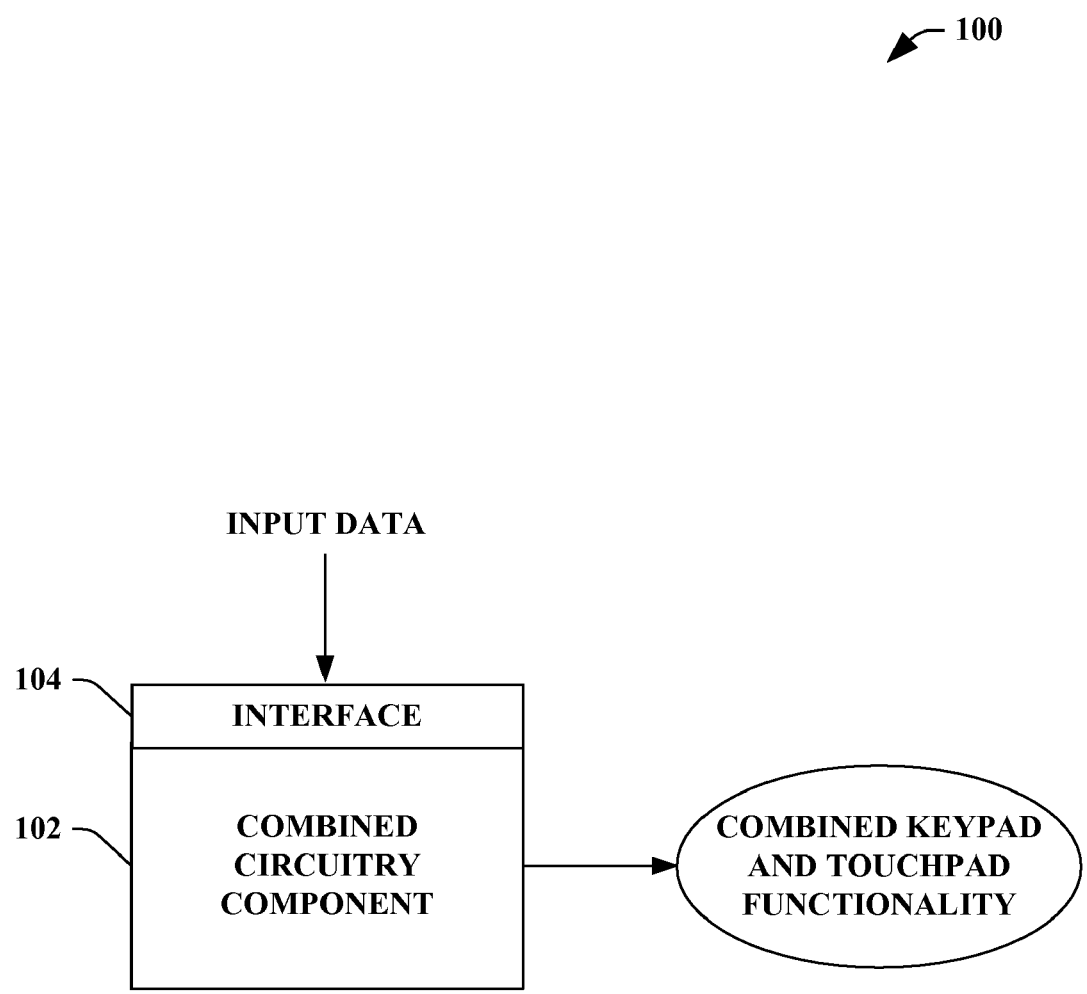
FIG. 1 illustrates a block diagram of an exemplary system that facilitates employing a circuit that combines keypad functionality and touchpad functionality.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "circuitry," "device," "processor," and the like are intended to refer to a computer-related entity, either hardware, software (e.g. in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing a circuit that combines keypad functionality and touchpad functionality. The system 100 mitigates difficulties associated with data entry by including a combined circuitry component 102 that enhances data entry with the ability to provide a keypad functionality and a touchpad functionality. The combined circuitry component 102 can utilize a single circuitry to provide conventional keypad data entry and position sensing for touchpad functionality. In particular, an interface component 104 (discussed infra) can receive input data, wherein the combined circuitry component 102 can employ position sensing (e.g., surface location about at least one key) and key sensing (e.g., depressing a specific key). The input data can be, but is not limited to being, a contact of a keypad surface, a partial depressing of a key on a keypad, a user input utilizing a portion of a digit (e.g., a finger, a thumb, etc.), a portion of a human body that can be detected with capacitance, an activation of a key and/or button on a keypad, any suitable input associated with a keypad and/or a touchpad. Moreover, it is to be appreciated that the use of the term keypad is intended to include any suitable input device associated with at least one of a number, letter, symbol, etc. of any language (e.g. English, Spanish, French, etc.).

For instance, a conventional keypad solely allows input based on depressing a key to input data such as pressing the number "7" to input the numeral seven. Yet, the claimed subject matter allows a keypad functionality and a touchpad functionality to be implemented utilizing a single circuitry. Thus, in one example, a user can utilize a portion of a digit to either depress a key on the keypad and/or drag a portion of a digit on the surface of the keypad to implement a touchpad functionality (e.g., utilizing position sensing to detect the input based on the motion on the surface). In other words, a user can be inputting data to a device by depressing keys and/or motioning (e.g. writing) on the surface of the keys with, for instance, a portion of a digit.

For instance, a user typically utilizes a mobile device to enter numeric data (e.g., dialing a phone number) and alphabetical characters (e.g. text messaging). Although conventional keypad data entry is well-suited for numeric data, it is inefficient, inaccurate, and meticulous. Yet, by providing a combination of keypad functionality and touchpad functionality for data entry on a single circuitry utilizing the keypad enhances and mitigates deficiencies related to data input. A user can utilize the keypad for data entry by depressing at least one key to activate such key (e.g., pressing the key for numeral 7, enters "7" as the data) and provide surface contact to allow the data entry to be detected motion and/or gestures. Thus, rather than utilizing predictive text input technology (e.g., T9) for entry of alphabetical characters, a user can motion and/or gesture the writing of letters (e.g., numbers, symbols, etc.) as a manner of inputting data. Additionally, this touchpad-keypad system allows one-hand alphanumeric data entry, which is usually difficult or time consuming with other technologies (e.g., T9, stylus, etc.).

In another instance, a user typically utilizes a device to enter data in a manner that is substantially similar to utilizing a mouse pointer and/or a pointing device (e.g., browsing the Internet, email scrolling, GPS navigation, utility applications, application selection, etc.). At least a portion of the keypad can be utilized in a manner that is substantially similar to a touchpad, yet such functionality is coupled to keypad functionality in a single circuitry. The keypad can then ascertain surface contact and incorporate position sensing to allow data entry and employment of functionality associated with a pointing device and/or a mouse pointer (e.g. roller ball, scrolling, etc.).

In another example, the combined circuitry component 102 can provide such dual functionality with a device (discussed in more detail infra). Additionally, the combined circuitry component 102 can utilize pre-defined motions that can initiate a particular function, feature, and/or application. For instance, a surface motion in a spiral motion on the keypad can indicate a speed-dial feature. It is to be appreciated that the system 100 can further utilize any suitable handwriting recognition techniques and/or mechanisms to facilitate detecting data input from a user. Furthermore, such recognition techniques and/or mechanisms can be pre-established on the system 100, trained by a specific user, and/or any combination thereof.

It is to be appreciated and understood that the claimed subject matter is to include any suitable technique, method, system, and/or algorithm associated with utilizing a keypad functionality and a touchpad functionality for data entry related to a device. The hardware implementation shown in the following figures comprises a capacitive sensor used for motion detection, yet such embodiment is not to be limited on the subject innovation. For instance, any suitable form of detecting changes in electromagnetic parameters can be utilized (e.g., magnetic, resistive, inductive, optical, etc.) and is to be considered within the scope of the claimed subject matter.

Moreover, the system 100 can include any suitable and/or necessary interface component 104 (herein referred to as "interface"), which provides various adapters, connectors, channels, communication paths, etc. to integrate the automatic combined circuitry component 102 into virtually any operating and/or database system(s). It is to be appreciated that the interface 104 can be, but is not limited to being, a keypad, a portion of a keypad, a key, a device input, a mobile communication device input, etc. In addition, the interface 104 can provide various adapters, connectors, channels, communication paths, etc., that provide for interaction with the automatic combined circuitry component 102, interface 104, and any other device and/or component associated with the system 100.

Figure 2:
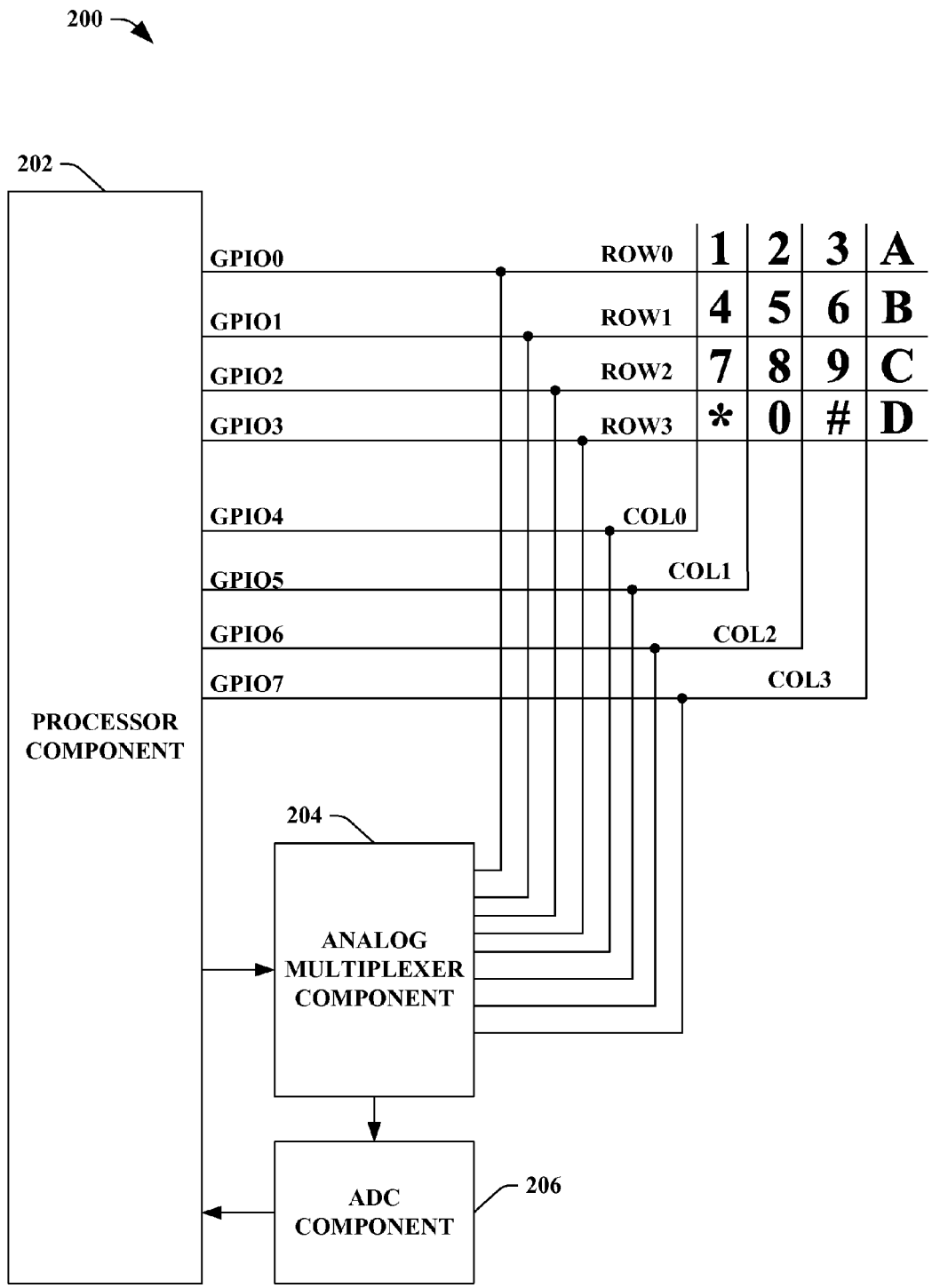
FIG. 2 illustrates a block diagram of an exemplary system that facilitates implementing circuitry that allows keypad entry and pointing device for data input.

FIG. 2 illustrates a system 200 that facilitates implementing circuitry that allows keypad entry and pointing device for data input. The system 200 can be associated with the combined circuitry component 102 (not shown for the sake of brevity) and can include a processor component 202 that can interact with a keypad having keys 1, 2, 3, 4, 5, 6, 7, 8, 9, *, #, 0, A, B, C, and D, wherein 0-9 are numeric keys and the remaining are function keys. The processor component 202 can comprise a plurality of General Purpose Input Output (GPIO) pins (e.g., depicted as GPIO0, GPIO1, GPIO2, GPIO3, GPIO4, GPIO5, GPIO6, and GPIO7) that can perform the scanning of a matrix of contacts. It is to be appreciated that any suitable number of GPIO pins can be utilized in connection with the subject innovation and eight (8) is not to be limiting. Moreover, the GPIO pins (e.g., GPIO0, GPIO1, GPIO2, GPIO3, GPIO4, GPIO5, GPIO6, and GPIO7) are re-labeled on the contact matrix side according to respective scanning functions (e.g., ROW0, ROW1, ROW2, ROW3, COL0, COL1, COL2, and COL3). The system 200 can further include an analog multiplexer component 204 that can interact with the GPIO pins and an analog-to-digital converter (ADC) component 206 that further work in conjunction with the processor component 202. The analog multiplexer component 204 can route analog variations in voltage in pins GPIO0 to GPIO7 to the ADC component 206 which translates these analog voltages into digital values. The digital values can be sent to the processor component 202 for motion detection when the device is working in position sensing mode and/or touchpad functionality mode (e.g., discussed in more detail infra).

It is to be appreciated and understood that the system 200 and respective circuitry is one example of implementing the claimed subject matter and that any nuances and/or subtleties are to be included within the scope of the subject innovation. For instance the following variations can be implemented and are to be covered by the subject innovation: the processor component 202, analog multiplexer component 204 and the ADC component 206 can be associated with a monolithic integrated circuit (IC) or a multi-chip module (MCM); multiplexing and A/D conversion can be performed by external devices; the software for interpretation of finger sliding and conversion into digital data can execute either in the internal microcontroller in an external device (e.g., special-purpose IC); and various software algorithms to sense changes in capacitance (discussed infra). It is to be appreciated that the system 200 can be implemented as a single IC, multiple ICs, a combination of IC(s) and discrete device, etc.

Figure 3:
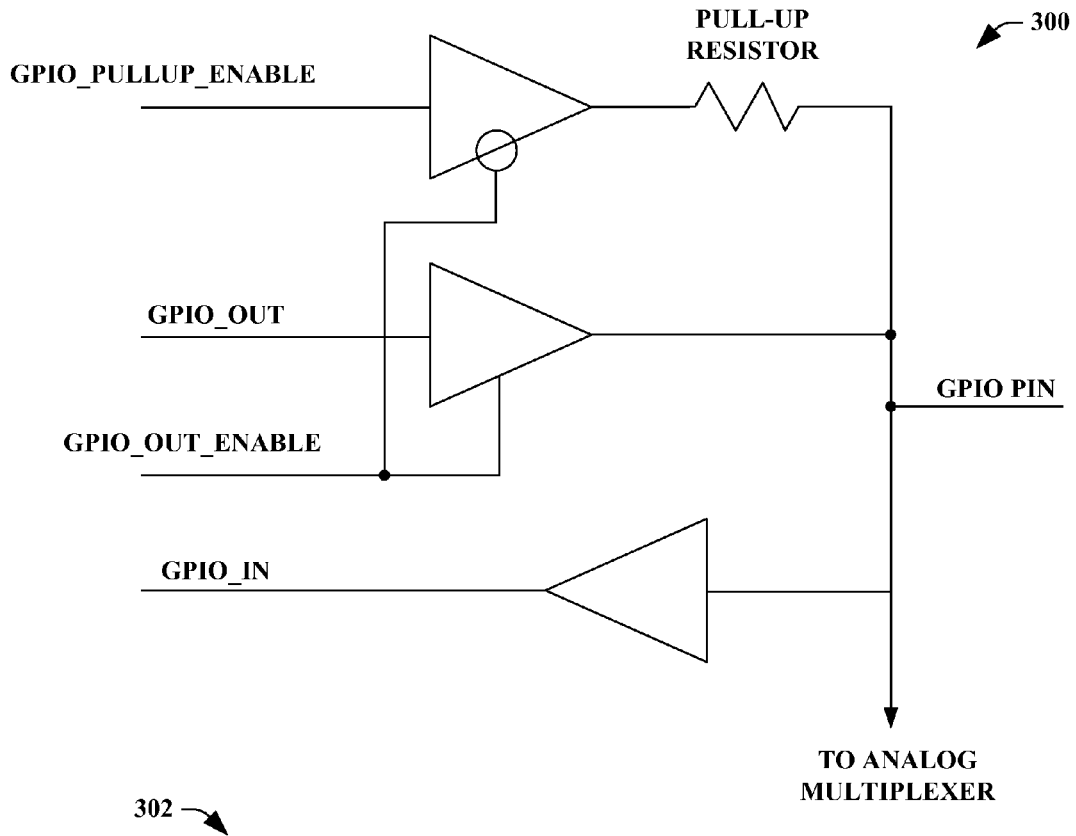
FIG. 3 illustrates a block diagram of an exemplary circuitry that facilitates data entry associated with a keypad and a touchpad.

Turning to FIG. 3 briefly, a circuitry 300 is illustrated that facilitates data entry associated with a keypad and a touchpad. The circuitry 300 can be a configuration for each GPIO pin (e.g., GPIO0, GPIO1, GPIO2, GPIO3, GPIO4, GPIO5, GPIO6, and GPIO7) associated with the processor component 202 of FIG. 2. As discussed above, it is to be appreciated that the processor component 202 and the subject innovation can include any suitable number of GPIO pins and the amount utilized for discussion is not to be limiting. Furthermore, the circuitry 300 is a general illustration of how I/O would work in connection with the claimed subject matter.

Each GPIO pin can include at least one of the following internal register bits that can be configured programmatically (among others): GPIO_PULLUP_ENABLE; GPIO_OUT; GPIO_IN; and GPIO_OUT_ENABLE. The GPIO_PULLUP_ENABLE can connect a high level voltage (e.g., 1.8V, 2.8V, 3.3V, etc.) to a pull-up resistor (e.g., 47 KOhms, 100 KOhms, a pull-down resistor, a combination of a pull-up and pull-down resistor, etc.). By connecting to such high level voltage and utilizing the pull-up resistor, a default high impedance high level can be maintained in the GPIO when working in digital input mode. The GPIO_OUT can provide a low impedance high or low (e.g. 0 Volts) voltage level to at least one GPIO pin when working in OUTPUT mode. GPIO_IN can read a pin voltage level when the GPIO pin is working in INPUT mode. In addition, for the GPIO pin to work as OUTPUT, the GPIO_OUT_ENABLE bit can be set (e.g., bit value=1, etc.). The GPIO_OUT_ENABLE bit can also disable GPIO_PULLUP_ENABLE since the last works in INPUT mode.

In one example associated with FIG. 3, a chart 302 illustrates the pull-up resistor can be utilized for digital mode input. For capacitive sensing operation, another resistor (e.g., such as resistor R in FIG. 5 discussed infra) can be utilized as part of the ADC component 206. It is to be appreciated that the pull-up resistor can also be utilized to perform the function of resistor R in FIG. 5 (not shown and discussed below).

Figure 4:
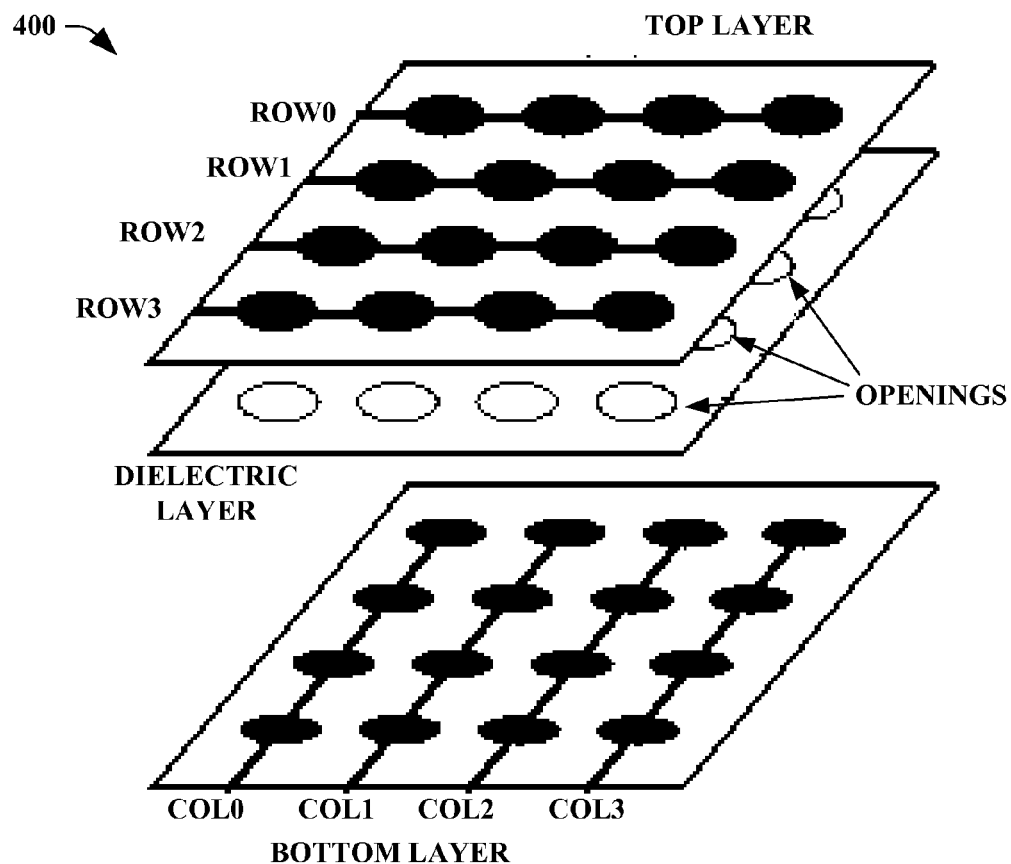
FIG. 4 illustrates an assembly of a portion of circuitry in accordance with an aspect of the claimed subject matter.
Figure 4:
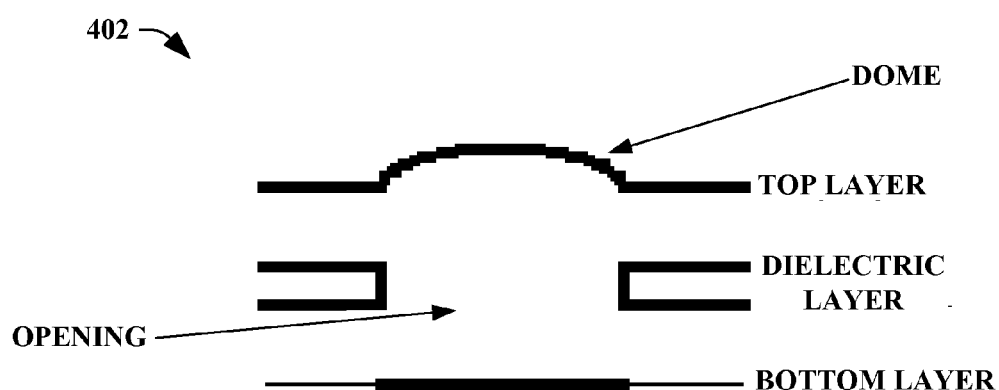

FIG. 4 illustrates an assembly 400 of a portion of circuitry in accordance with an aspect of the claimed subject matter. The assembly 400 is an exemplary assembly in accordance with an aspect of the subject innovation and is not to be limiting. The assembly 400 of a portion of circuitry can allow the functionality of a keypad and a touchpad to be employed within a single circuit board, which in turn, reduces cost and increases savings since a single device includes both functionalities while reducing the unit size and providing a larger display area. A top layer, a dielectric layer, and a bottom layer can be included with the assembly 400, wherein the totality of the assembly can be a keypad, a portion of a keypad, a key, etc. Thus, the assembly 400 illustrates a contact matrix of the keypad having numeric keys 0 through 9 and function keys *, #, A, B, C, and D (e.g., as utilized in previous figures as examples). It is to be appreciated that the top layer, dielectric layer and bottom layer can be any suitable shape and/or size and the illustrated shape and/or size is not to be limiting on the subject innovation.

The contact matrix (e.g., the totality of each layer of the assembly 400) can comprise a flexible and/or rigid printed circuit board (PCB) with the top layer that includes horizontal metal traces represented as ROW0, ROW1, ROW2, and ROW3. The top layer further includes convex metal domes to provide a slightly raised portion to facilitate depressing a key on the keypad. The convex metal dome is further depicted in a cross-section 402 of a single contact (e.g. wherein the single contact can be any suitable key associated with the keypad and in this example can be at least one of the numeric keys 0 through 9 or one of the function keys). The contact matrix further includes a bottom layer that can incorporate at least one vertical metal trace represented as COL0, COL1, COL2, and COL3. Moreover, the contact matrix includes the dielectric layer in between the top layer and the bottom layer, wherein the dielectric layer (e.g., non-conductive) isolates the metal traces from the top layer and the bottom layer. It is to be appreciated that the dielectric layer can include at least one opening associated with each key to allow contact to be made between the top layer and the bottom layer upon such key being depressed. A portion of the keypad is depicted in more detail in the cross-section 402 which illustrates a single key having a dome with the top layer, a dielectric layer with an opening between the top layer and the bottom layer, and the bottom layer. Furthermore, it is to be appreciated that the top layer and the bottom layer can be any suitable electrically conductive material.

Figure 5:
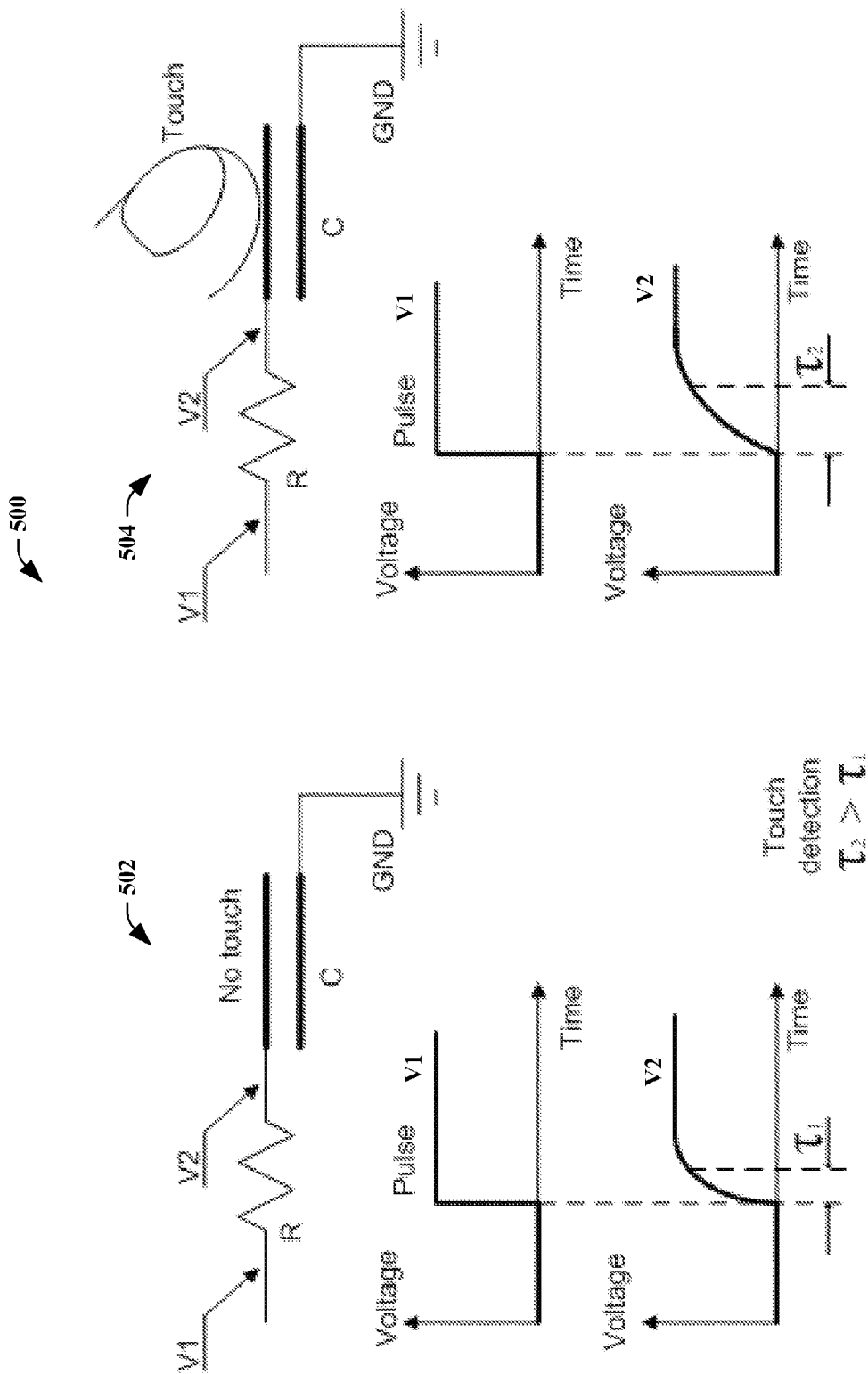
FIG. 5 illustrates a technique that facilitates capacitive sensing in accordance with an aspect of the subject innovation.

FIG. 5 illustrates a technique 500 that facilitates capacitive sensing in accordance with an aspect of the subject innovation. The technique 500 allows the functionality of both keypad (e.g., by detecting connection based on a depressing of a key) and position sensing (e.g. by detecting changes in capacitance). In capacitance sensing (e.g., position sensing) mode, changes in capacitance can be detected between ROW0, ROW1, ROW2, ROW3 and COL0, COL1, COL2, and COL3 as a result of a portion of contact from a user. For instance, the user can utilize a portion of a digit (e.g., a finger, a thumb, a toe, etc.) to provide a change in capacitance on the keypad.

A first circuit 502 can include a first voltage (V1) and a second voltage (V2) with no input and thus no change in capacitance detected. Further depicted below the circuit 502 are two graphs (e.g., displaying voltage versus time) associated with the circuit 502 (e.g., no input circuit), wherein a first graph illustrating the correlating pulse and a second graph indicating a time constant represented by $\tau_1$. A second circuit 504 depicts a data input (e.g., a touch from a user, a portion of a digit, a contact from a user, etc.) allowing a detection of change in capacitance in such circuit 504. Below the circuit 504 are two graphs (e.g. voltage versus time), wherein the first graph indicates a voltage pulse and the second graph illustrates a time constant that has increased based on the data input (e.g., a touch) which is represented by $\tau_2$. By comparing the differences in time, a data input such as a touch can be detected since $\tau_2$ is greater than $\tau_1$.

In particular, the first circuit 502 and the second circuit 504 provide a capacitive sensing mode. In the capacitive sensing mode, the dome-shaped metal surface in the top layer (e.g., discussed above in FIG. 4) and the flat metal surface in the bottom layer form a capacitor with a dielectric layer in the middle, including an air gap (e.g., an opening) between the both metal surfaces. This capacitor can be represented as "C" in the first circuit 502 and the second circuit 504. The close presence of a finger produces an increase of capacitance that can be measured by calculating the time constant (e.g., $\tau_2$ and $\tau_1$) during the charging of the capacitor "C."

Figure 6:
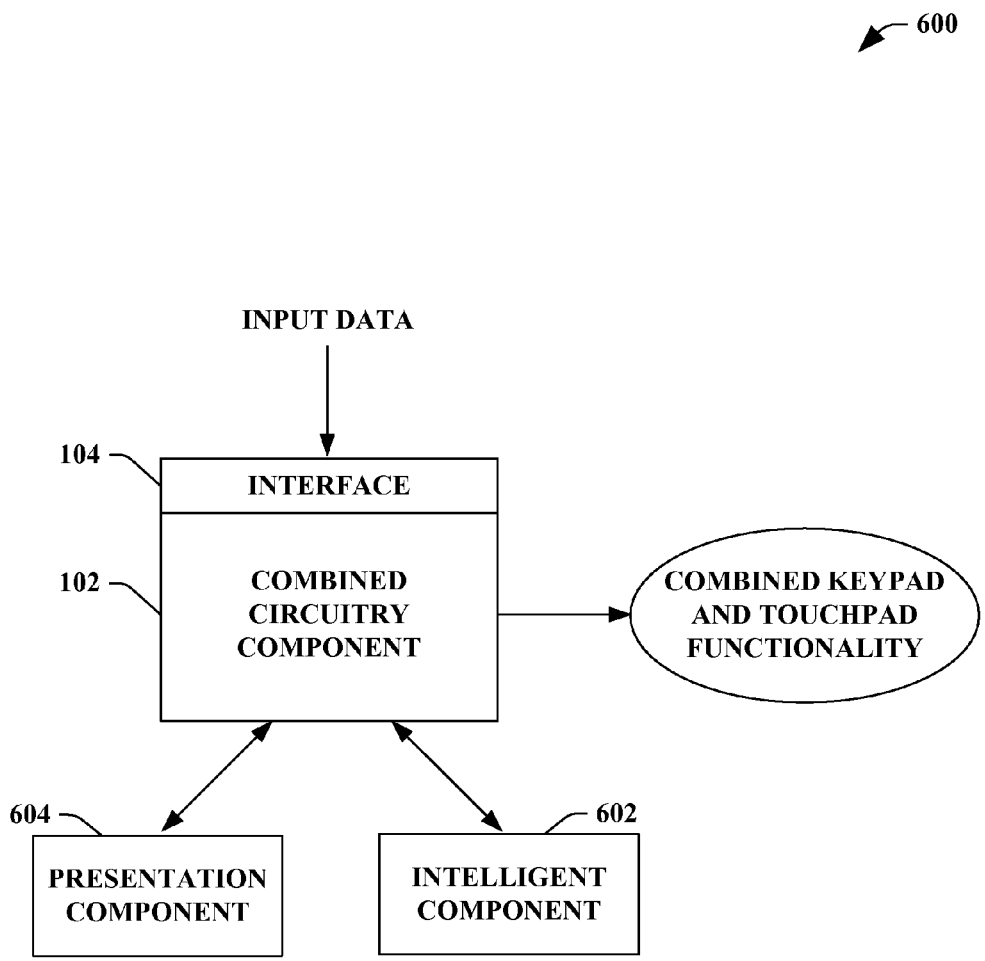
FIG. 6 illustrates a block diagram of an exemplary system that facilitates employing a circuit that combines keypad functionality and touchpad functionality.

FIG. 6 illustrates a system 600 that employs intelligence to facilitate employing a circuit that combines keypad functionality and touchpad functionality. The system 600 can include the combined circuitry component 102 and the interface 104. It is to be appreciated that the combined circuitry component 102 and the interface 104 can be substantially similar to respective components, and interfaces described in previous figures. The system 600 further includes an intelligent component 602. The intelligent component 602 can be utilized by the combined circuitry component 102 to facilitate employing dual functionality for data entry such as a keypad mode and a touchpad mode. For example, the intelligent component 602 can infer data entry, context related to data entry, handwriting, mode of operation (e.g., keypad function, touchpad function, etc.), user profiles, user settings, preferences, dialect related to geographic region, handwriting tendencies, stroke recognition, purposeful surface contact, purposeful key depression, pre-programmed gestures, interpret the user's input out of the context of the preceding input, etc.

It is to be understood that the intelligent component 602 can provide for reasoning and/or determining about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The combined circuitry component 102 can further utilize a presentation component 604 that provides various types of user interfaces to facilitate interaction between a user and any component coupled to the combined circuitry component 102. As depicted, the presentation component 604 is a separate entity that can be utilized with the combined circuitry component 102. However, it is to be appreciated that the presentation component 604 and/or similar view components can be incorporated into the combined circuitry component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the combined circuitry component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequently entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
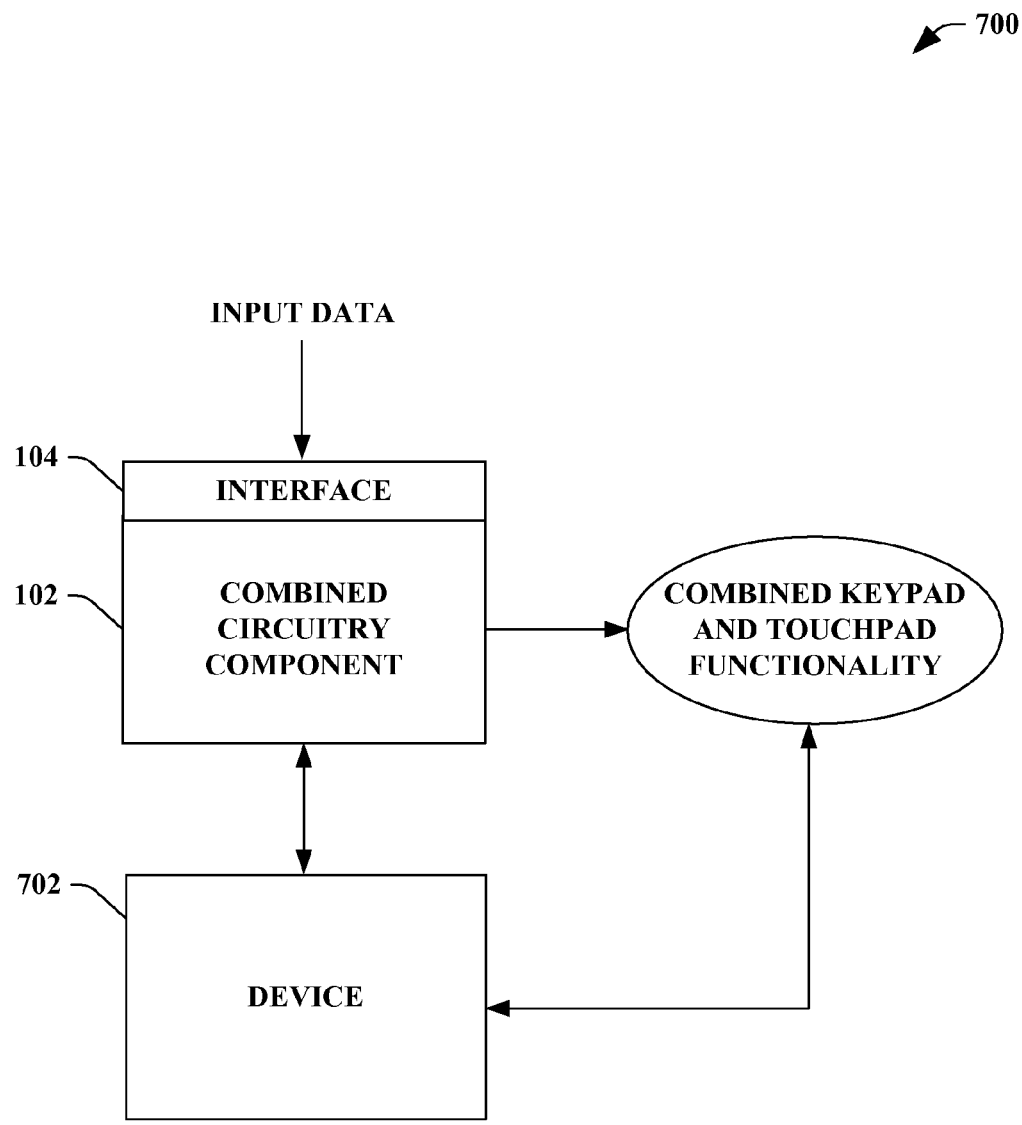
FIG. 7 illustrates a block diagram of an exemplary system that facilitates providing a keypad function and a position sensing function associated with a device to allow data entry.

FIG. 7 illustrates a system 700 that facilitates providing a keypad function and a position sensing function associated with a device to allow data entry. The combined circuitry component 102 can provide dual functionality related to data entry, wherein a first mode allows keypad functionality (e.g., pressing a key) and a second mode allows touchpad functionality (e.g., contact of a keypad surface to detect motion for input). Moreover, such dual functionality can be implemented on a single circuitry to provide at least one of the following: reduce cost and size; a single device performing two modes of data input; allowing the increase of display area on a device; providing a user-friendly data input technique; improving the man-machine interface; reducing usability gap between mobile communication devices and computers; and improving one-hand data entry in comparison to conventional techniques.

Furthermore, it is to be appreciated that the dual and/or combined functionality can be seamlessly transitioned there between in a dynamic manner. In other words, a user can be inputting data by depressing a key on a keypad and then initiate a surface contact with the keypad to utilize touchpad data input. The system 700 can ascertain whether or not such surface contact is accidental, purposeful, and/or user accidental contact. Thus, when a user is depressing a series of keys (e.g. dialing a phone number), the system 700 comprehends whether such surface contact is incidental to the intentional data input (e.g., in this case, depressing a series of keys rather than touchpad functionality data input).

The combined functionality of keypad and touchpad provided by the combined circuitry component 102 can be utilized by, for instance, a device 702. The combined functionality of keypad data input and touchpad data input utilizing a single circuitry can be implemented with any suitable device that incorporates data entry. Moreover, the dual functionality of the claimed subject matter can be integrated into any suitable user interface associated with the device 702. For instance, the device can be, but is not limited to being, a smart phone, a mobile communication device, a cellular device, a text messenger, a portable digital assistant (PDA), a mobile phone, a personal communicator, a handheld device, a handheld gaming device, a portable computer, a desktop, a laptop, a pager, a tablet PC, a communication device, any suitable device utilizing a keypad for data entry, an Internet browsing device, a stereo, a car stereo, a dashboard related to an automobile, any device employing at least one key and/or button, etc.

In one example, the device can be a cellular device utilizing a typical keypad with numeric keys 0 through 9 with a # and a * key. A user would conventionally solely be able to enter data by pressing at least one key associated with the device. For instance, to dial a number, the user would depress the keys respective to each number. Yet, the subject innovation allows a disparate data entry mode that utilizes the concept of a touchpad in combination with the typical keypad data entry. The cellular device can include a position sensing functionality that can detect a surface contact on at least one of the keys associated with the keypad. Once contact is initiated, the device can ascertain the particular motion and/or gesture and utilize such motion and/or gesture as a data entry. For instance, a user can touch the surface of the keys to draw a letter, a number, a symbol, and the like, wherein the device will recognize and allow as an input. In other words, rather than pressing each individual number for input on the cellular device, the user can draw such numbers on the keypad. However, it is to be appreciated that the user can utilize the keypad mode, the touchpad mode, and/or any combination thereof. By allowing the touchpad mode for data entry, one-hand data input is greatly optimized and made easier for any user.

Figure 8:
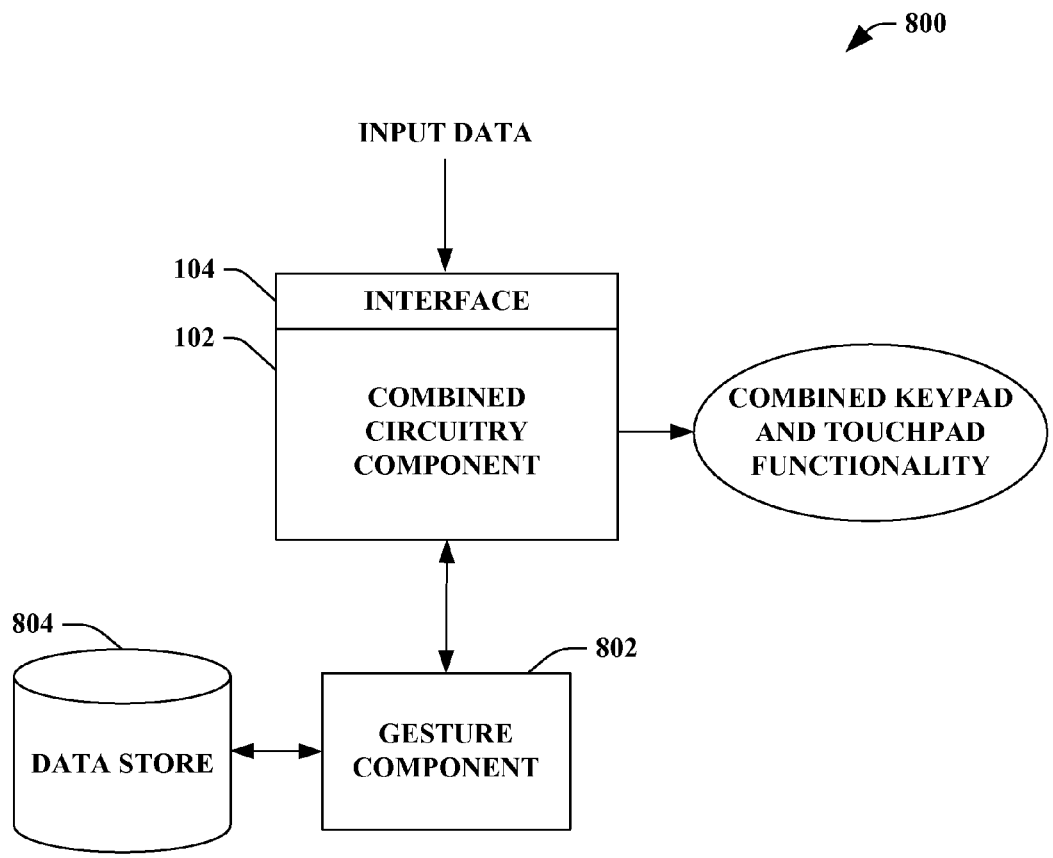
FIG. 8 illustrates a block diagram of an exemplary system that facilitates utilizing a designated motion to employ a particular functionality utilizing a position sensing data input mode.

FIG. 8 illustrates a system 800 that facilitates utilizing a designated motion to employ a particular functionality utilizing a position sensing data input mode. The system 800 can include the combined circuitry component 102 that received a data input via the interface 104 and can provide keypad functionality and/or touchpad functionality utilizing a single circuit. The combined circuitry component 102 can facilitate entering data based on providing a keypad input (e.g. depressing a key associated with a keypad) and a touchpad input (e.g., ascertaining the contact of a portion of the surface associated with a keypad to provide an input based on motion and/or gesture of contact). For instance, input data can be, but is not limited to, a contact of a keypad surface, a partial depressing of a key on a keypad, a user input utilizing a portion of a digit (e.g., a finger, a thumb, etc.), a portion of a human body that can be detected with capacitance, an activation of a key and/or button on a keypad, any suitable input associated with a keypad and/or a touchpad.

The combined circuitry component 102 can utilize a gesture component 802 that can assign functions and/or features to specific gestures and/or motions detected utilizing position sensing (e.g., touchpad functionality). In one example, the gesture component 802 can allow a user to train and/or assign gestures and/or motions to certain functions and/or features. Thus, a user can assign a spiral motion detected on the keypad with a speed-dial feature. It is to be appreciated that any motion and/or gesture can be assigned to any suitable function and/or feature. The function and/or feature can be, but is not limited to, a speed-dial, address book, speaker phone, activating keypad functionality, de-activating keypad functionality, activating touchpad functionality, de-activating touchpad functionality, calculator applications, application executions, etc.

Figure 9:
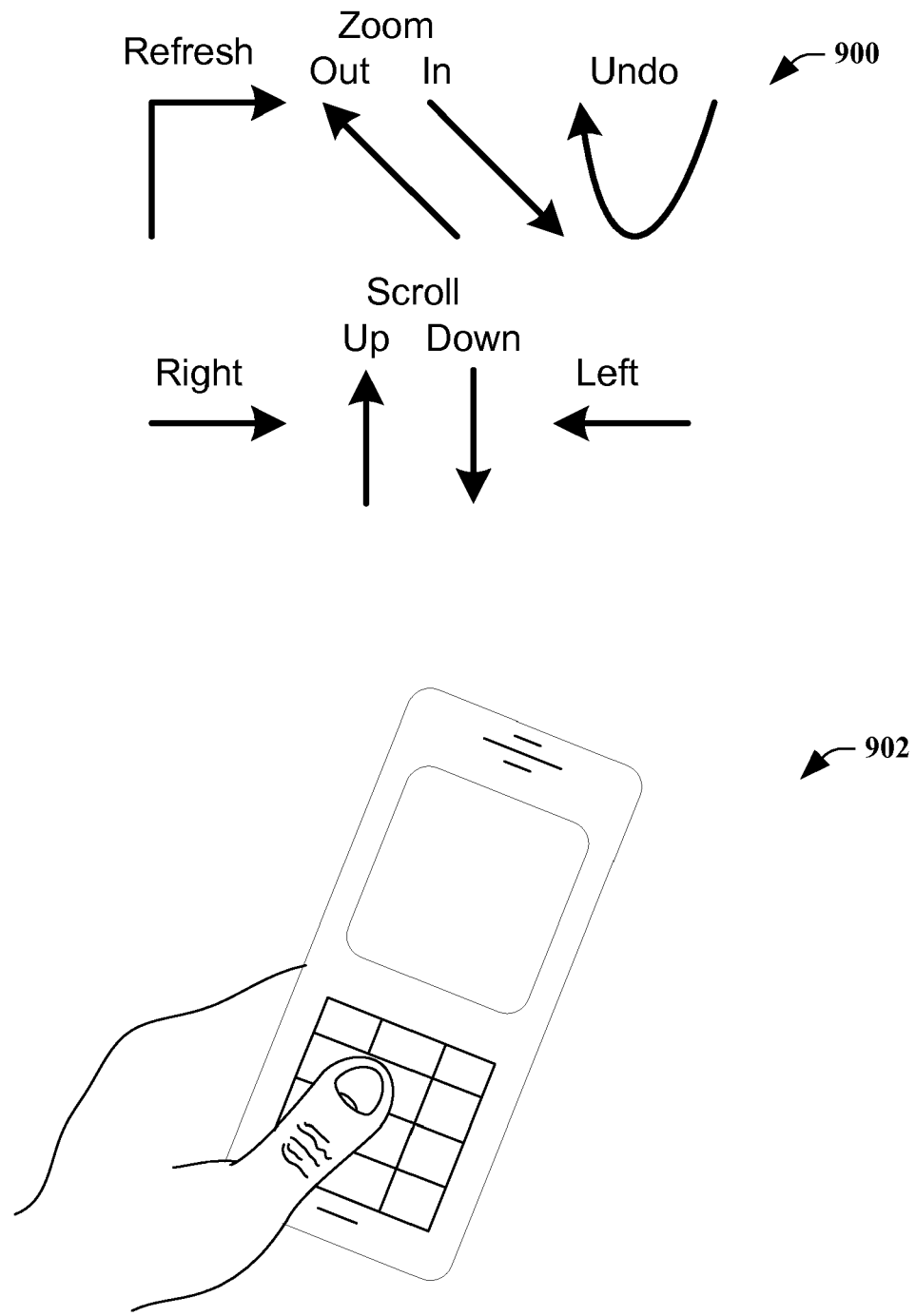
FIG. 9 illustrates a block diagram of an exemplary set of pre-defined gestures and/or motions that facilitates inputting data within a device in accordance with the subject innovation.

Moreover, the gesture component 802 can provide pre-established motions and/or gestures that can be assigned to execute particular functions, features, and/or applications. Turning to FIG. 9 briefly, an exemplary set 900 of pre-defined gestures and/or motions are illustrated. The set 900 provides particular functions such as refresh, zoom in, zoom out, undo, right, scroll up, scroll down, and left. Moreover, at reference numeral 902, a technique of holding a mobile communication device and inputting data in accordance with the subject innovation is depicted. The technique illustrates one-hand data entry while utilizing the keypad to detect surface contact.

Referring back to FIG. 8, the combined circuitry component 102 can further utilize a data store 804. The data store 804 that can include any suitable data related to the interface 104, combined circuitry component 102, the gesture component 802, any other component described within the context of the claimed subject matter, etc. For example, the data store 804 can include, but not limited to including, pre-defined gestures and/or motions, user settings, user preferences, training algorithms, GPIO pin data, processor settings, analog multiplexer data, analog-to-digital converter data, device integration data, interface data, etc.

It is to be appreciated that the data store 804 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 804 of the subject systems and methods is intended to comprise, without being limited to, these and any other suitable types of memory. In addition, it is to be appreciated that the data store 804 can be a server, a database, a hard drive, and the like.

In one example, the system 800 can be utilized by a device such as a cellular phone. The user of the cellular phone can connect to a network, a website and/or the Internet to receive any pre-defined gestures and/or motions to link to specific functions and/or features for the cellular phone. In another example, the user can upload user-defined motions and/or gestures to the Internet, website, and/or a network to allow disparate users to access such user-defined motions and/or gestures. Moreover, a manufacturer for a particular mobile communication device utilizing the combined circuitry component 102 to provide dual functionality related to keypad and touchpad data entry can provide device-specific motions and/or gestures that relate to device-specific features and/or functions.

Figure 10:
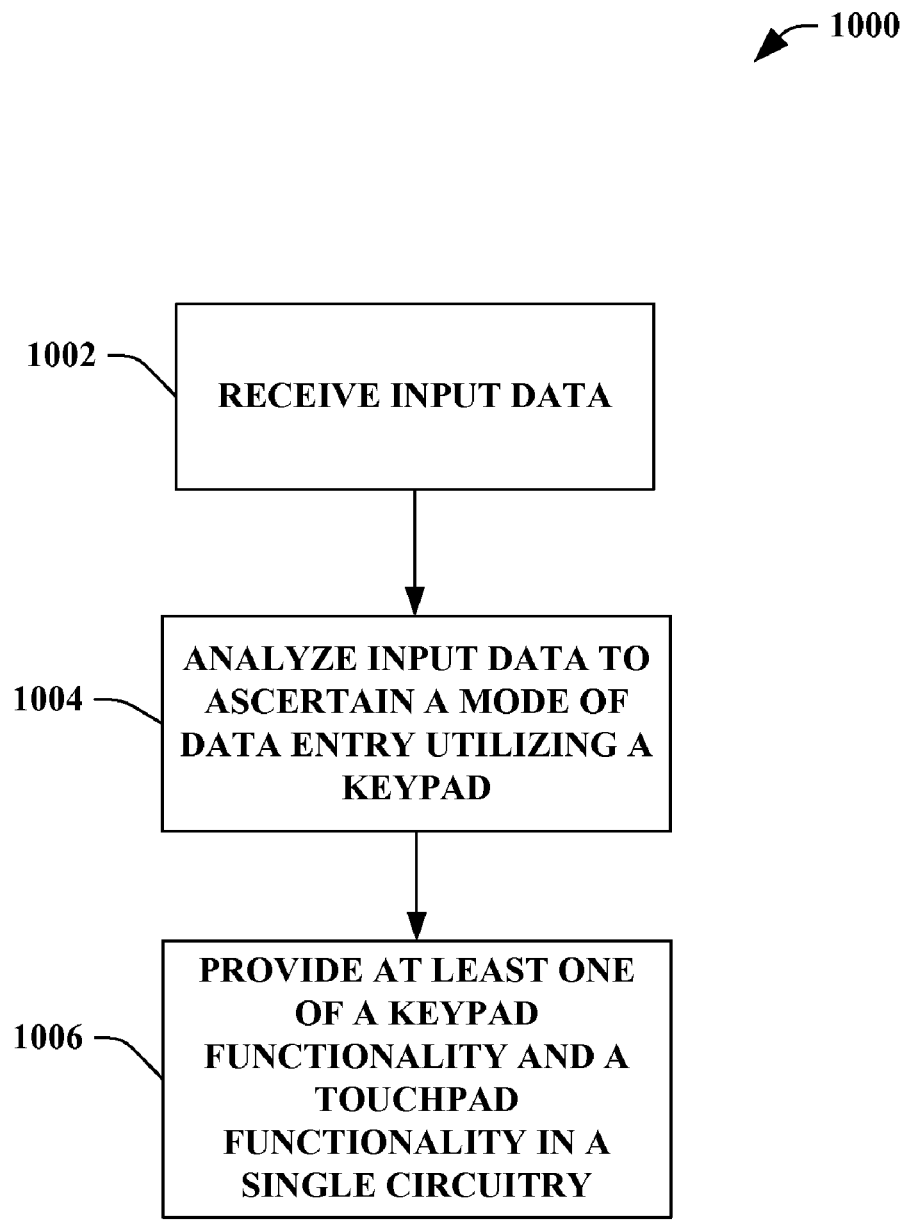
FIG. 10 illustrates an exemplary methodology that facilitates employing a circuit that combines keypad functionality and touchpad functionality.
Figure 11:
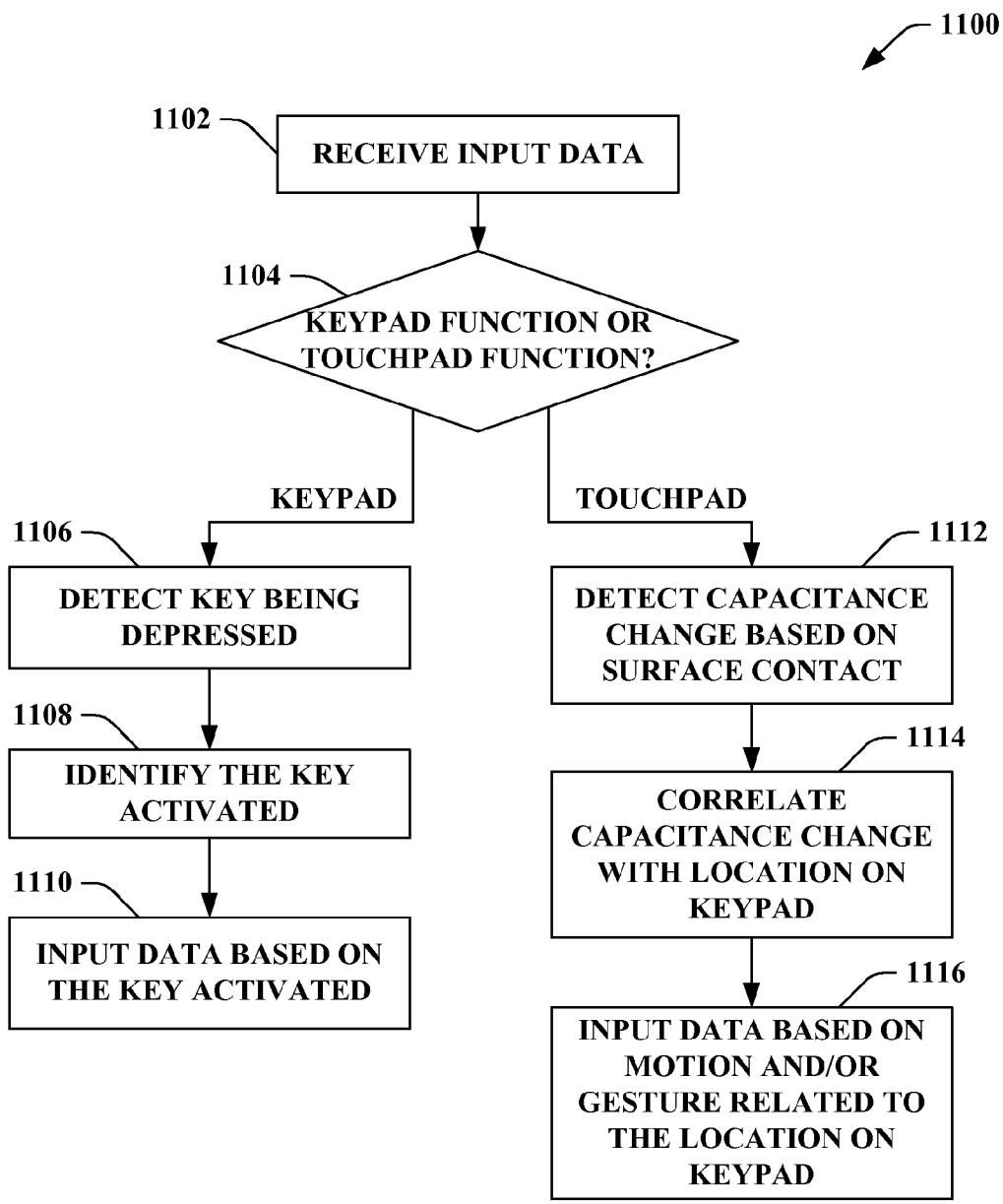
FIG. 11 illustrates an exemplary methodology that facilitates software processing of data entry associated with a keypad and a touchpad.
Figure 12:
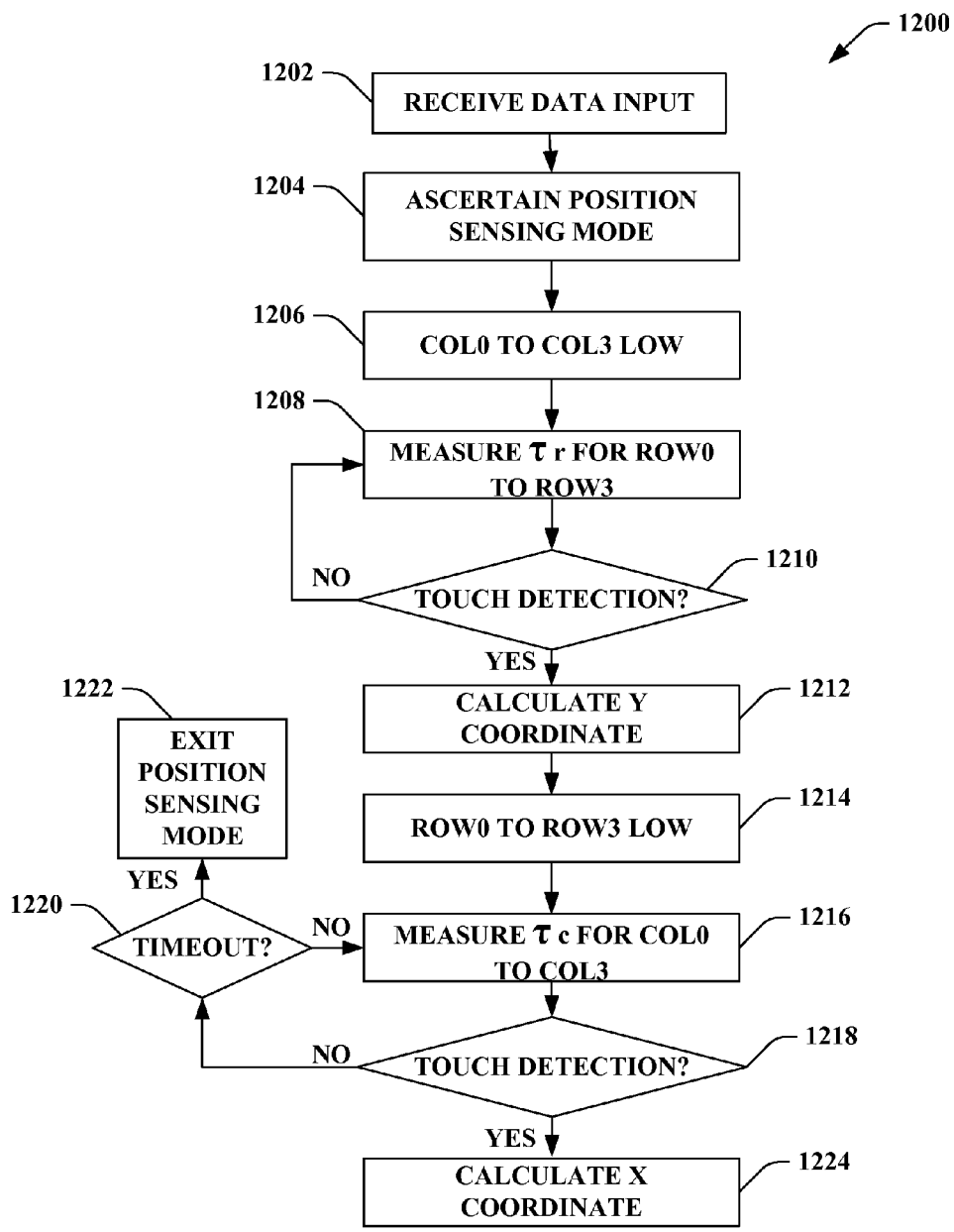
FIG. 12 illustrates an exemplary methodology for inputting data to a device utilizing a touchpad functionality.

FIGS. 10-12 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 10 illustrates a methodology 1000 that facilitates employing a circuit that combines keypad functionality and touchpad functionality. At reference numeral 1002, a data input can be received. The data input can be, but is not limited to being, a contact of a keypad surface, a partial depressing of a key on a keypad, a user input utilizing a portion of a digit (e.g., a finger, a thumb, etc.), a portion of a human body that can be detected with capacitance, an activation of a key and/or button on a keypad, any suitable input associated with a keypad and/or a touchpad.

At reference numeral 1004, the input data can be analyzed to ascertain a mode of data entry utilizing a keypad. It is to be appreciated that the use of the term keypad is intended to include any suitable input device associated with at least one of a number, letter, symbol, etc. of any language (e.g., English, Spanish, French, etc.). At reference numeral 1006, at least one of a keypad functionality and a touchpad functionality can be provided in a single circuitry. The determination of whether data entry is to utilize keypad functionality or touchpad functionality can be based at least in part upon the input data received. Thus, if a user initiates a pressing of a button, the mode can be keypad functionality; yet if the user initiates a dragging of a digit (e.g., a finger, a thumb, etc.) on a portion of the keypad, the mode can be touchpad functionality.

For example, a user can utilize a portion of a digit to either depress a key on the keypad and/or drag a portion of a digit on the surface of the keypad to implement a touchpad functionality (e.g., utilizing position sensing to detect the input based on the motion on the surface). In other words, a user can be inputting data to a device by depressing keys and/or motioning (e.g., writing) on the surface of the keys with, for instance, a portion of a digit. Moreover, such data entry can be implemented on any suitable device. For instance, the device can be, but is not limited to being, a smart phone, a mobile communication device, a cellular device, a text messenger, a portable digital assistant (PDA), a mobile phone, a personal communicator, a handheld device, a handheld gaming device, a portable computer, a desktop, a laptop, a tablet PC, a communication device, any suitable device utilizing a keypad for data entry, an Internet browsing device, a stereo, a car stereo, a dashboard related to an automobile, any device employing at least one key and/or button, etc.

FIG. 11 illustrates a methodology 1100 for data entry associated with a keypad and a touchpad. At reference numeral 1102, an input data can be received. The data input can be, but is not limited to being, a contact of a keypad surface, a partial depressing of a key on a keypad, a user input utilizing a portion of a digit (e.g. a finger, a thumb, etc.), a portion of a human body that can be detected with capacitance, an activation of a key and/or button on a keypad, any suitable input associated with a keypad and/or a touchpad.

At reference numeral 1104, a determination of whether a keypad function or touchpad function is to be utilized. If a keypad function is to be employed, the methodology continues at reference numeral 1106, where a key being depressed on a keypad can be detected. At reference numeral 1108, the key being activated can be identified. At reference numeral 1110, based on the key activated, the input data can be entered.

If a touchpad function is to be employed, the methodology continues at reference numeral 1112, where a capacitance change can be detected based at least in part upon a surface contact on the keypad. At reference numeral 1114, the capacitance change can be correlated with a location on the keypad. At reference numeral 1116, based on the motion and/or gesture related to the location on the keypad, the input data can be entered.

FIG. 12 illustrates a methodology 1200 for inputting data to a device utilizing at least one of a keypad functionality and a touchpad functionality. At reference numeral 1202, a data input can be received. At reference numeral 1204, position sensing mode can be ascertained. For instance, a user can initiate a surface contact to a keypad, wherein such action can initiate position sensing mode. At reference numeral 1206, COL0 to COL3 can be low. At reference numeral 1208, $\tau_r$ can be measured for ROW0 to ROW3. At reference numeral 1210, a determination if a touch is detected. If no detection, the methodology proceeds to reference numeral 1208. If a touch is detected, the methodology proceeds to reference numeral 1212. At reference numeral 1212, a Y coordinate can be calculated. At reference numeral 1214, ROW0 to ROW3 can be low. At reference numeral 1216, $\tau_r$ can be measured for COL0 to COL3. At reference numeral 1218, a determination can be made related to detecting a touch. If no touch is detected, the methodology proceeds to reference 1220, wherein another determination is made whether a timeout is established. If there is a timeout, the methodology proceeds to reference numeral 1222. At reference numeral 1222, the position sensing mode is exited. If there is no timeout, the methodology proceeds to reference numeral 1216. Referring back to reference numeral 1218, if there is a touch detected, the methodology proceeds to reference numeral 1224. At reference numeral 1224, an X coordinate can be calculated.

Figure 13:
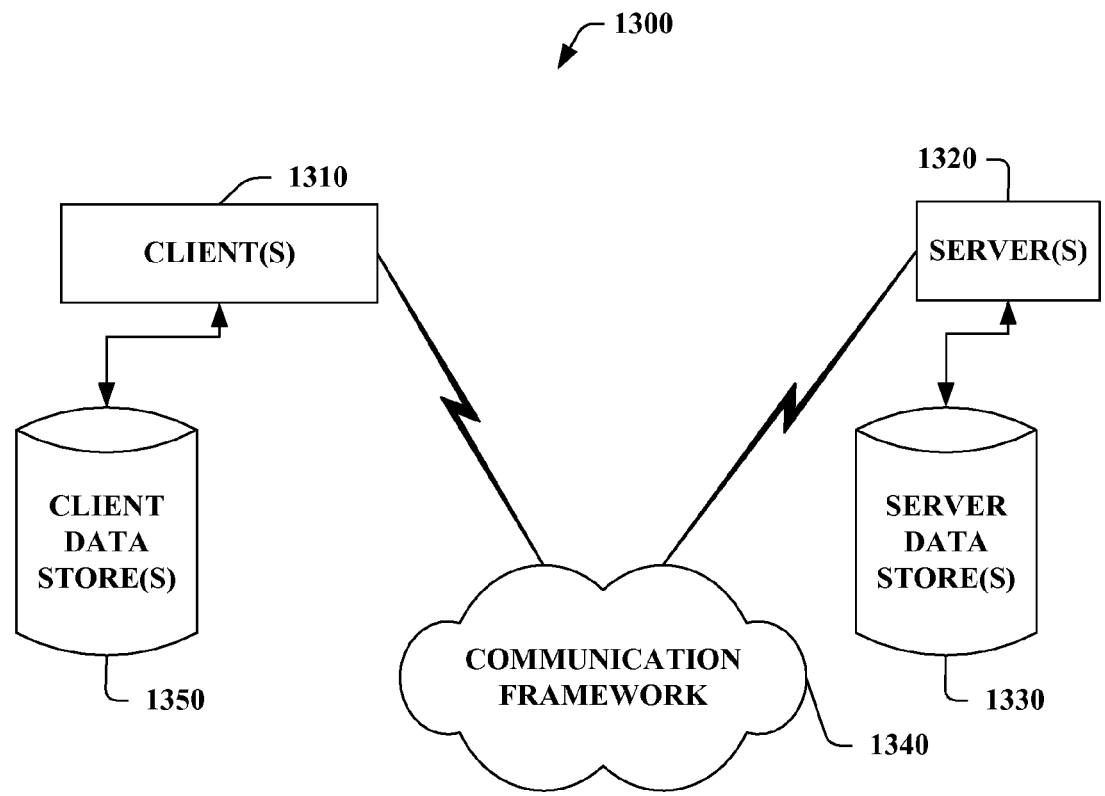
FIG. 13 illustrates an exemplary networking environment, wherein the novel aspects of the claimed subject matter can be employed.
Figure 14:
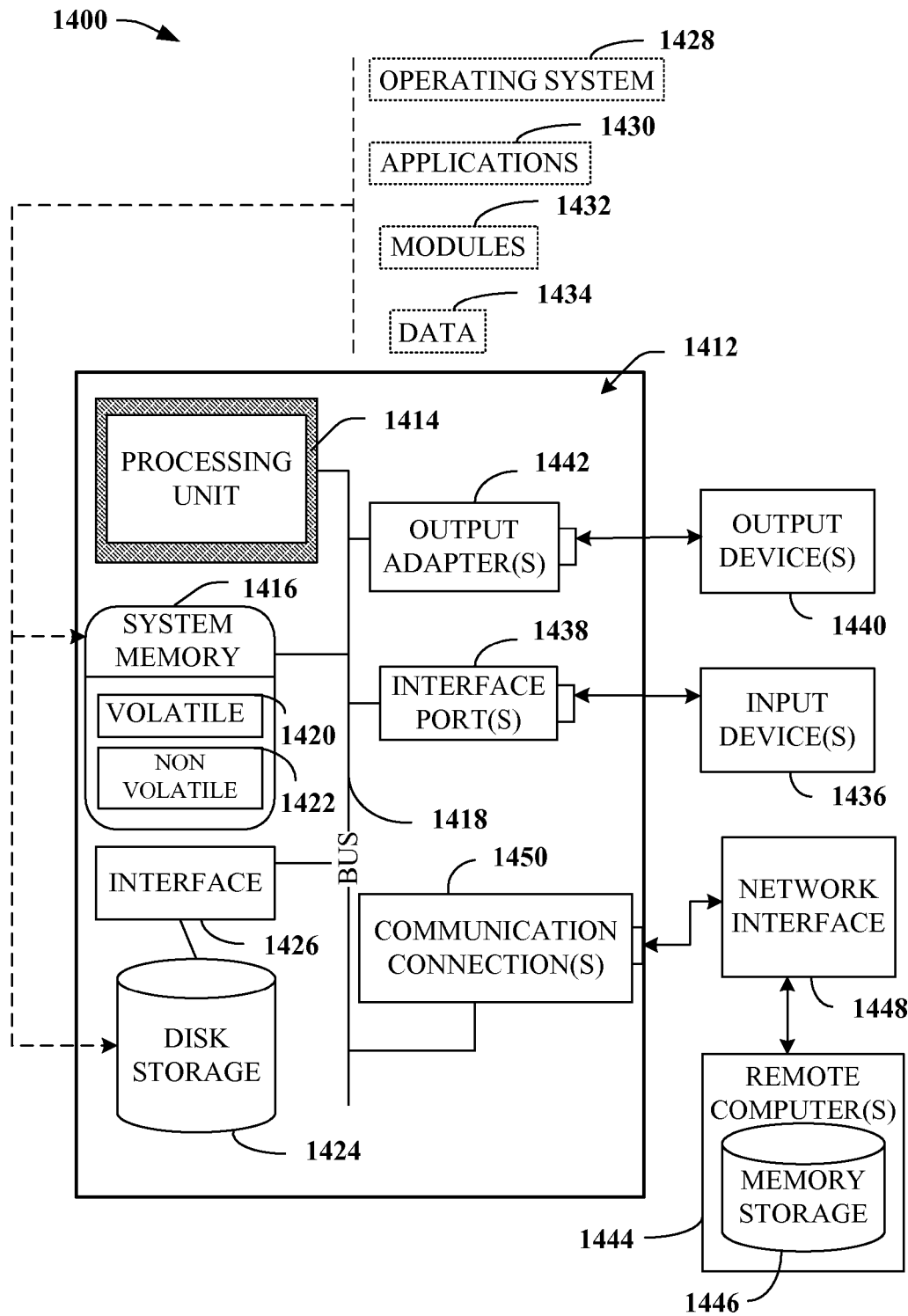
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For example, a combined circuitry component that provides a keypad functionality and a touchpad (e.g., position sensing) functionality, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, any suitable non-disk storage (e.g. flash memory), floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system, comprising:
an interface configured to receive an input; and
a combined circuitry component configured to provide one of keyboard functionality or touchpad functionality based on an analysis of the input;
wherein the combined circuitry component includes a layer substantially adjacent to the interface, and between the interface and another layer of the combined circuitry component, the layer configured to at least partly provide both the keyboard functionality and the touchpad functionality.

2. The system of claim 1, the keypad functionality includes a matrix key scanning principle associated with a keypad.

3. The system of claim 1, the touchpad functionality includes a matrix capacitance scanning principle in a variable-capacitance pointing device.

4. The system of claim 1, the touchpad functionality is based at least in part upon position sensing related to the input.

5. The system of claim 1, the input includes at least one of the following: an indication of at least one of a contact or pressure, an input that can be detected with capacitance, an activation of a key on a keypad, an input associated with a keypad, or an input associated with a touchpad.

6. The system of claim 1, the keypad functionality or the touchpad functionality are configured to respond to utilization of a portion of a keypad.

7. The system of claim 1, the combined circuitry component is configured to utilize at least one of a processor component, an analog multiplexer component, or an analog-to-digital converter component to detect at least one of a surface contact or a key activation associated with a keypad.

8. The system of claim 1, the keypad functionality is configured to respond to a depressing of a key on a keypad.

9. The system of claim 1, the touchpad functionality is configured to detect motion associated with at least a portion of a surface contact related to a key on a keypad.

10. The system of claim 1, further comprising a portion of a circuit board to implement the keypad functionality or the touchpad functionality, the circuit board includes the layer substantially adjacent to the interface, a dielectric layer, and a bottom layer, the circuit board is coupled to an intelligent component configured to infer at least one of data entry, context related to data entry, handwriting, mode of operation, profiles, settings, preferences, dialect, purposeful surface contact, purposeful surface key depression or pre-programmed gestures.

11. The system of claim 10, the layer substantially adjacent to the interface includes a raised portion for a dome that relates to a key on a keypad.

12. The system of claim 11, the dielectric layer includes at least one opening aligned with the raised portion of the dome.

13. The system of claim 12, the bottom layer and the layer substantially adjacent to the interface include an electrically conductive material and, with the dielectric layer arranged therebetween, are configured to form a capacitor, the capacitor is coupled to a presentation component capable of rendering at least one of a dialogue box, a static control, a drop-down menu, a list box, a pop-up menu, a combo box, a radio button, a check box, a push button, a graphic box, a vertical scroll bar or a horizontal scroll bar.

14. The system of claim 1, further comprising a device configured to utilize at least one of the keypad functionality or the touchpad functionality.

15. The system of claim 14, the device includes at least one of a smart phone, a mobile communication device, a cellular device, a text messenger, a portable digital assistant (PDA), a mobile phone, a personal communicator, a handheld device, a handheld gaming device, a portable computer, a desktop, a laptop, a pager, a tablet PC, a communication device, any suitable device utilizing a keypad for data entry, an Internet browsing device, a stereo, a car stereo, a dashboard related to an automobile, or any device employing at least one key.

16. The system of claim 1, further comprising a gesture component configured to respond to a pre-defined gesture.

17. The system of claim 16, wherein the gesture component is trainable to assign a motion detected by the interface to at least one of a speed-dial feature, an address book feature, a speaker phone feature or a calculator feature.

18. A computer-implemented method, comprising:
receiving an input at an input interface;
analyzing the input to determine whether to respond with one of a keypad functionality or a touchpad functionality; and
based on the analyzing, providing at least one of the keypad functionality or the touchpad functionality for data entry to a device, at least in part by sensing at a same layer of the device the input to at least partly provide either the keypad functionality or the touchpad functionality, the same layer being arranged substantially adjacent to the input interface, and between the input interface and another layer of the device associated with providing the at least one of the keypad functionality or the touchpad functionality.

19. The method of claim 18, further comprising:
detecting a motion related to a surface contact on a keypad associated with the device; and
detecting a pressure related to a key on the keypad associated with the device.

20. The method of claim 18, further comprising responding to a gesture linked to a function of the device.

21. An apparatus, comprising:
an interface configured to receive an input;
a layer configured to operate both in a capacitive sensing mode and in a mode responsive to pressure on a keypad; and
circuit-based logic configured to provide one of a keypad functionality or a touchpad functionality, responsive to the input, at least partly in one of the capacitive sensing mode or the mode responsive to pressure on the keypad; wherein the layer is substantially adjacent to the interface, and between the interface and another layer associated with the circuit based logic.

\* \* \* \* \*